US008583365B2

(12) United States Patent
Jang et al.

(10) Patent No.: US 8,583,365 B2
(45) Date of Patent: Nov. 12, 2013

(54) ROUTE GUIDE SYSTEM AND METHOD USING STATE INFORMATION OF POI (75) Inventors: In Sung Jang, Daejeon (KR); Moonsoo Lee, Daejeon (KR); Kyoung Hwan An, Daejeon (KR); Kyoung-Wook Min, Daejeon (KR); Ju Wan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 863 days.

(21) Appl. No.: 12/628,176

(22) Filed: Nov. 30, 2009

(65) Prior Publication Data

US 2010/0138151 A1 Jun. 3, 2010

(30) Foreign Application Priority Data

Dec. 1, 2008 (KR) .................. 10-2008-0120809
Apr. 21, 2009 (KR) .................. 10-2009-0034549

(51) Int. Cl.
*G01C 21/34* (2006.01)
(52) U.S. Cl.
USPC ........... 701/426; 701/423; 701/431; 701/438; 701/533; 340/995.14; 340/995.23; 340/995.24
(58) Field of Classification Search
USPC ......... 701/201, 400–417, 420, 423–429, 438, 701/532, 533; 340/988–996
See application file for complete search history.

(56) References Cited

U.S. PATENT DOCUMENTS

| 5,559,707 A * | 9/1996 | DeLorme et al. | 701/467 |
|---|---|---|---|
| 5,902,492 A * | 5/1999 | Suzuki et al. | 216/27 |
| 5,948,040 A * | 9/1999 | DeLorme et al. | 701/426 |
| 6,121,924 A * | 9/2000 | Meek et al. | 342/357.43 |
| 6,321,158 B1 * | 11/2001 | DeLorme et al. | 701/426 |
| 6,362,779 B1 * | 3/2002 | Meek et al. | 342/357.77 |
| 6,401,034 B1 * | 6/2002 | Kaplan et al. | 701/416 |
| 6,542,814 B2 * | 4/2003 | Polidi et al. | 701/454 |
| 6,587,782 B1 * | 7/2003 | Nocek et al. | 701/438 |
| 6,601,073 B1 * | 7/2003 | Robare | 340/995.1 |
| 6,850,837 B2 * | 2/2005 | Paulauskas et al. | 701/426 |
| 7,099,882 B2 * | 8/2006 | McDonough | 340/990 |
| 7,660,666 B2 * | 2/2010 | Finn et al. | 701/533 |
| 8,010,279 B2 * | 8/2011 | Kobuya et al. | 701/438 |
| 2003/0158658 A1 | 8/2003 | Hoever et al. | |
| 2003/0182052 A1 * | 9/2003 | DeLorme et al. | 701/201 |
| 2003/0191578 A1 * | 10/2003 | Paulauskas et al. | 701/200 |
| 2004/0236504 A1 * | 11/2004 | Bickford et al. | 701/207 |
| 2008/0133124 A1 * | 6/2008 | Sarkeshik | 701/201 |
| 2008/0140309 A1 * | 6/2008 | Jendbro | 701/202 |
| 2009/0276318 A1 * | 11/2009 | Broadbent et al. | 705/14.64 |
| 2009/0292458 A1 * | 11/2009 | Nakamura et al. | 701/200 |
| 2010/0017108 A1 * | 1/2010 | Nakamura et al. | 701/200 |
| 2010/0023252 A1 * | 1/2010 | Mays et al. | 701/201 |
| 2010/0082241 A1 * | 4/2010 | Trivedi | 701/208 |
| 2011/0131243 A1 | 6/2011 | Aben et al. | |

FOREIGN PATENT DOCUMENTS

| JP | 10-082652 | 3/1998 |
|---|---|---|
| JP | 2002-092785 A | 3/2002 |
| JP | 2005-156290 A | 6/2005 |
| JP | 2007-333698 A | 12/2007 |
| KR | 1020060037481 A | 5/2006 |
| KR | 10-2006-0063629 A | 6/2006 |
| KR | 1020080040963 A | 5/2008 |
| KR | 1020080083824 A | 9/2008 |
| KR | 10-2011-0084498 A | 7/2011 |
| WO | WO 2006/062324 A1 | 6/2006 |

* cited by examiner

*Primary Examiner* — Russell Frejd

(57) ABSTRACT

A route guide method includes collecting state information of respective points of interest (POIs) and storing the collected state information in a state information database, extracting state information of one or more candidate POIs with reference to the state information database according to a request for the state information of the one or more candidate POIs, and applying the extracted state information of the candidate POIs to routes to the respective POIs to guide a user along the routes to the respective candidate POIs.

20 Claims, 8 Drawing Sheets

ROUTE GUIDE SYSTEM AND METHOD USING STATE INFORMATION OF POI

CROSS-REFERENCE(S) TO RELATED APPLICATION(S)

The present invention claims priority of Korean Patent Applications No. 10-2008-0120809, filed on Dec. 1, 2008, and No. 10-2009-0034549, filed on Apr. 21, 2009, which are incorporated herein by reference.

FIELD OF THE INVENTION

The present invention relates to a route guide system and, more particularly, to a method of guiding along a route to a point of interest by applying dynamic state information of the point of interest and a system using the method.

BACKGROUND OF THE INVENTION

As well known in the art, with recent advances in mobile communication technologies, there are widely used a route guide system providing navigation services for estimating an optimal route and/or the shortest route from a current position at which a vehicle is located to a desired destination or point of interest (hereinafter, referred to "POI"), and for providing the estimated route to a user in a form of an image and voice.

A navigation service, to which a global navigation satellite system (GNSS) designed for a vehicle is applied, displays a current position of the vehicle using information received from global positioning system (GPS) satellites and provides facilities based on the current position of the vehicle such that a driver can arrive at a desired POI safely within the shortest travel time. The navigation service obtains a current position and direction of the vehicle using the information received from the GPS satellites, displays a road map and the current position of the vehicle on the road map by map-matching the road map with the current position. In addition, the navigation service tracks a route to the POI based on the POI input by a user using a preset route tracking method, and guides the user along an optimal and/or the shortest route by comparing the current position of the vehicle and a route on which the vehicle travels currently.

However, the above-mentioned POI tracking in the route guide system does not consider dynamic state information of the POI. For example, when a user searches for a POI such as a hospital while on holiday and/or late at night, the user desires to search for a hospital capable of providing clinical and diagnostic services even on holidays and/or late at night. However, the route guide system does not use state information of POI such as whether or not the POI does business and provides clinical services, but provides only a name and a location of the POI, that is static information of the POI. Therefore, the route guide system cannot provide information of the POI useful to the user.

SUMMARY OF THE INVENTION

It is, therefore, an object of the present invention to provide a method of guiding along a route while applying dynamic state information of a point of interest to the route and a system using the same.

In accordance with a first aspect of the present invention, there is provided a method of a route guide method, which includes:

collecting state information of respective points of interest (POIs) and storing the collected state information in a state information database;

searching one or more candidate POIs for the state information database and extracting the state information of the candidate POIs, in response to a request for the state information of the one or more candidate POIs; and applying the extracted state information of the candidate POIs to routes to the respective POIs to guide along the routes to the respective candidate POIs.

In accordance with a second aspect of the present invention, there is provided a state information providing device of POIs (points of interest), which includes:

a state information collector for collecting state information of the respective POIs;

a state information database for storing the state information collected by the state information collector;

a state information analyzer for managing history data of the state information collected by the state information collector and generating analysis results by performing statistical analysis upon the history data;

a history/analysis database for storing the history data and the analysis results which are generated by the state information analyzer; and a state searching unit for searching one or more candidate POIs for the state information database when the state information of the one or more candidate POIs is requested and extracting state information of the candidate POIs, wherein the state information of the candidate POIs is applied to routes to the respective POIs so as to guide along the routes.

In accordance with a third aspect of the present invention, there is provided a navigation device, which includes:

a map data database for storing map data;

a route searching unit for applying state information of one or more candidate POIs to the map data in the map data database to produce routes to the respective POIs; and an output unit for visually providing the routes to guide along the routes.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENT

Hereinafter, embodiment of the present invention will be described in detail with reference to the accompanying drawings.

Figure 1:
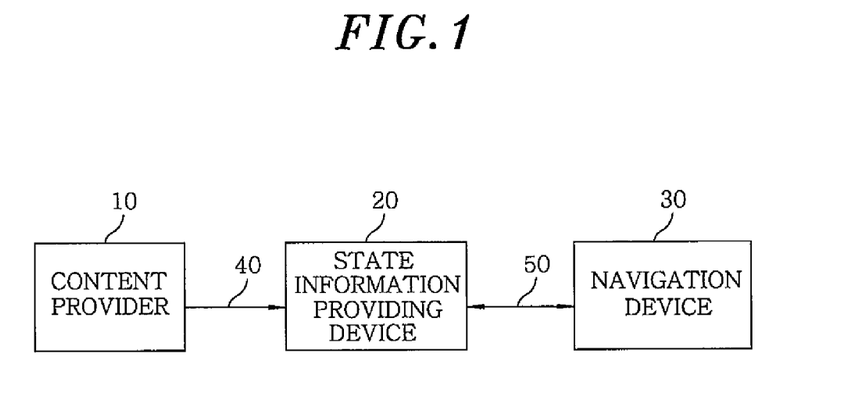
FIG. 1 is a block diagram of a route guide system using state information of a point of interest (POI) in accordance with an embodiment of the present invention.

FIG. 1 shows a route guide system using state information of a point of interest (POI) in accordance with an embodiment of the present invention. As shown in FIG. 1, the route guide system includes a content provider 10, a state information providing device 20, and a navigation device 30.

The content provider 10 may include a public content provider or a private content provider who provides contents that are updated in real time. Contents provided by the content provider 10 include typical operating hours of POI (i.e., opening time to closing time), which is used as state information of POI in the present invention. The contents further includes state information of POI relating to the number of service staff members in the POI, service price, a ranking of recommendation, discount, coupon event, a real-time image for presentation, and waiting time for services. For example, in a case where the POI is a tourist attraction, the state information of the POI may include the minimal time for sightseeing, the average sightseeing time, an available capacity of a parking zone, an image for presentation, an admission fee, and so on. The state information of the POI is provided to the state information providing device 20 through a communication network, e.g., the wire/wireless Internet.

The state information providing device 20 collects and analyzes state information of POIs from the content provider 10. Further, the state information providing device 20, in response to a request for the state information of POIs from the navigation device 30, extracts the state information of the POIs to provide the same to the navigation device 30.

The navigation device 30 selects POIs to be searched for and requests the state information providing device 20 to provide the state information of the POIs and receives the state information of the POIs from the state information providing device 20. The request for the state information of the POIs by the navigation device 30 may be classified into two types. One is a request for the state information of POIs on a name basis and the other one is a request for the state information of POIs on a business type/theme basis. For example, the following Table 1 illustrates a list of the request for the state information of the name-based POIs.

TABLE 1

| IDENTIFICATION | REFERENCE TIME | REQUESTED STATE INFORMATION | IDENTIFICATIONS OF POIS TO BE SEARCHED FOR |
|---|---|---|---|
| 012-345-6789 | current time | closing time price | gas station-A gas station-B ... |

In Table 1, a first row lists a plurality of items including identification, reference time, requested state information, and POI identification to be searched for. A second row represents search conditions for the items in the first row.

The 'identification' represents a unique code assigned to a user who is subscribed to a route guide service provided from the state information providing device 20.

The unique code, e.g., 012-345-6789, may be entered in the list by a user of the navigation device 30.

The 'reference time' is an option to select the current time, the arrival time to POI or after the service time that is the time to spend for the service at POI, and the selected option becomes a time point for obtaining information on whether or not the POI is operating for business at that time point. In a case where the POI is a tourist attraction, e.g., a museum, it is necessary to consider the average (or minimal) sighting time. This is because the POI of the museum is in an open state upon arrival at the POI but the visit to the POI is unsuccessful when enough sightseeing time for the POI is not guaranteed.

The 'requested state information' represents the state information of POI requested by a user as search conditions, for example, closing time, price, etc.

The 'POI identification to be searched for' represents names of POIs indicating specific POIs such as "gas station-A", "gas station-B," and so on as search conditions.

On the other hand, the following Table 2 illustrates a list of the request for the state information of the business types/themes POIs.

TABLE 2

| IDENTIFICATION | CURRENT POSITION (X, Y) | REFERENCE TIME | REQUESTED STATE INFORMATION | DISTANCE/TIME/ SUPPLEMENTARY OPTION | BUSINESS TYPE/ THEME TO BE SEARCHED FOR |
|---|---|---|---|---|---|
| 012-345-6789 | 100, 200 | arrival time | closing time price | distance<5km and operating state=OPEN and reliability>=98% | children's hospital |

In Table 2, a first row lists a plurality of items including identification, current position (x,y), reference requested state information, distance/time/supplementary option, and business type/theme to be searched for. A second row represents search conditions for the items in the first row.

Descriptions of the same items in Table 2 as those in Table 1 will be omitted. The distance/time/supplementary option includes a space condition, a time condition, and a supplementary condition as search conditions. The space condition is to set a radius range or distance from the navigation device 30 to the POI. The time condition is to set the travel time from a current position to the POI. The supplementary condition is to get preference and reliability for POI. The business type/theme is to set a business type or theme of the POI which a user searches for.

Figure 2:
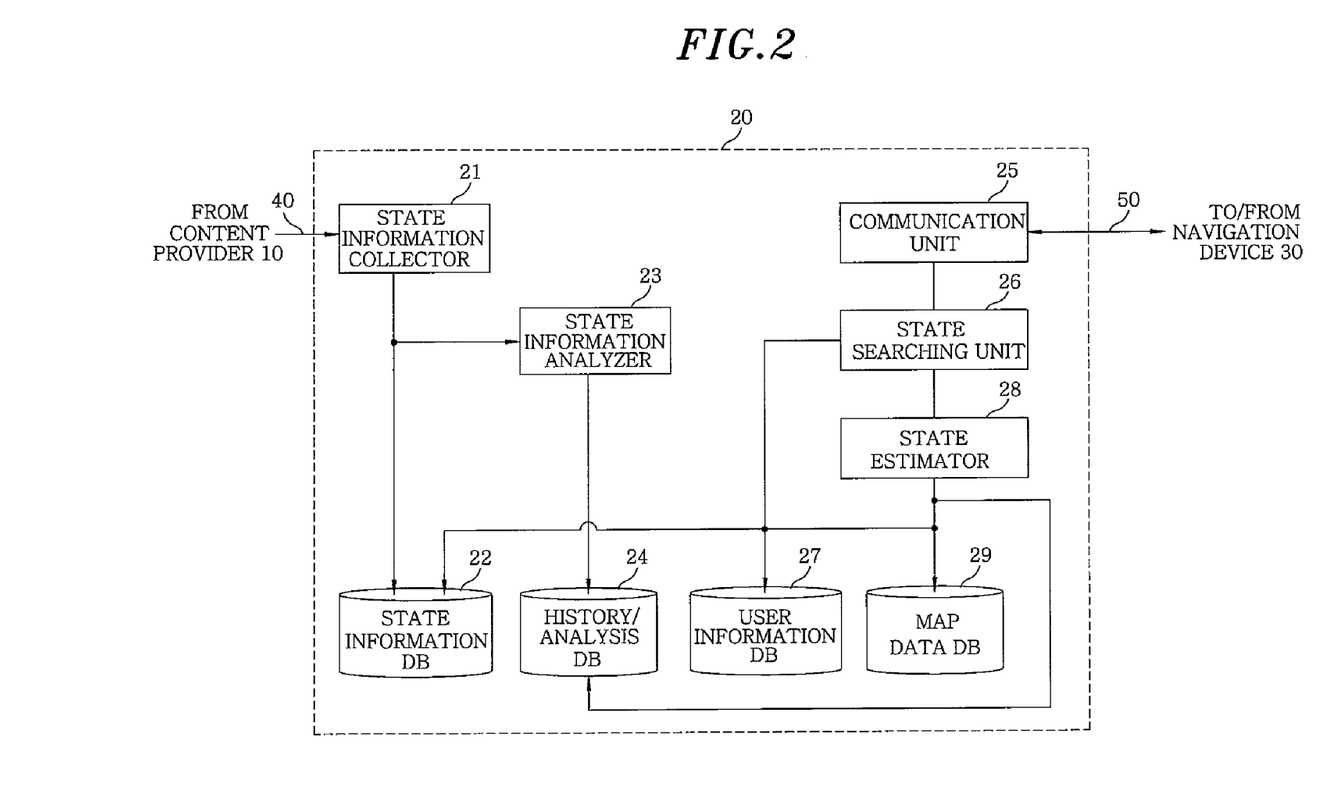
FIG. 2 is a detailed block diagram of a state information providing device shown in FIG. 1.

FIG. 2 shows a detailed block diagram of the state information providing device 20 as shown in FIG. 1. As shown in FIG. 2, the state information providing device 20 includes a state information collector 21, a state information database (hereinafter, referred to as a 'DB') 22, a state information analyzer 23, a history/analysis data DB 24, a communication unit 25, a state searching unit 26, a user information DB 27, a state estimator 28 and a map data DB 29.

The state information collector 21 collects state information of POIs provided from the content provider 10 and stores the collected state information into the state information DB 22. For example, in a case where the POI is a gas station-A, the state information collector 21 accesses a server of the gas station-A to obtain state information of the gas station-A periodically or non-periodically, or collects the state information of the gas station-A by analyzing syntax of a web page provided by the server. The state information collection may be performed in various ways such as web service, RSS (rich site summary) service, and the like. Moreover, the state information collector 21 combines the collected state information of the POIs. In a case where the state information of the gas station-A is operating hours and fuel price, for example, the combination means that the operating hours are obtained from a C-server (or a C-web site) of the gas station-A and information on the fuel price is obtained from a D-server (or a D-web site) of the gas station-A such that the state information of the gas station-A is combined with the identification assigned to the gas station-A.

The state information analyzer 23 manages history data of the state information of POIs collected by the state information collector 21 and performs statistical analysis of the history data to generate analysis results. The history data and the analysis results are stored in the history/analysis data DB 24 and are updated whenever new history data and analysis results are generated. The state information of POI, for example, the closing time of the POI may be inquired in real time or may be estimated according to a pattern of the history data when occasion demands. In this case, the reliability of the state information of POI is preferably described together.

The communication unit 25 interfaces signals to be transmitted and received between the state information providing device 20 and the navigation device 30 through a communication network 50, e.g., the wire/wireless Internet. The communication unit 25 provides a request for state information, that is, a request for state information of name-based POIs or a request for state information of business type/theme-based POIs to the state searching unit 26.

The state searching unit 26 authenticates, when there is a request for state information of POIs from the navigation device 30, whether the navigation device 30 or the user of the navigation device 30 has authority to use a route guide service served by the state information providing device 20 by using the identification stored in the user information DB 27. After authentication, the state searching unit 26 searches one or more candidate POIs for the state information DB 22 and extracts state information of the candidate POIs corresponding to the request for state information from the navigation device 30. The extracted state information of the candidate POIs is filled in the list of the request for state information and is then provided to the navigation device 30 through the communication unit 50.

When there is omitted information from the list of requests for state information, the state searching unit 26 provides a correction request signal to the state estimator 28 to request the correction of such omitted information.

In the extraction of the state information, the state searching unit 26 checks the reference time for determining the state of POI. If the reference time is the current time, the state searching unit 26 sets the time required for POI into zero. If the reference time is the arrival time to the respective candidate POIs, the state searching unit 26 calculates the travel time taken to the respective candidate POIs and sets the time required for POI to the travel time. And, if the reference time is a time point after the service time (for example, after sightseeing) that is the time to spend for the service at POI, the state searching unit 26 sets the time required for POI to the time calculated by adding the service time to the travel time taken to the respective candidate POIs.

Moreover, the state searching unit 26 performs filtering of the respective candidate POIs in which the travel times are calculated according to the reference times to determine rankings of the candidate POIs based on ranking references such as time/distance orders. The filtering includes a primary filtering of the candidate POIs performed by verifying validity of the respective candidate POIs with reference to the state information of the candidate POIs in which the travel times to the candidate POIs are calculated and a secondary filtering performed by carrying out supplementary condition (i.e., the preference and reliability) comparison of the respective candidate POIs whose validity verification have been succeeded. After the filtering, as described above, the rankings of the candidate POIs which are subjected to the primary and secondary filtering are determined and the list of the state information of the POIs having the determined rankings is then provided to the navigation device 30.

Figure 4:
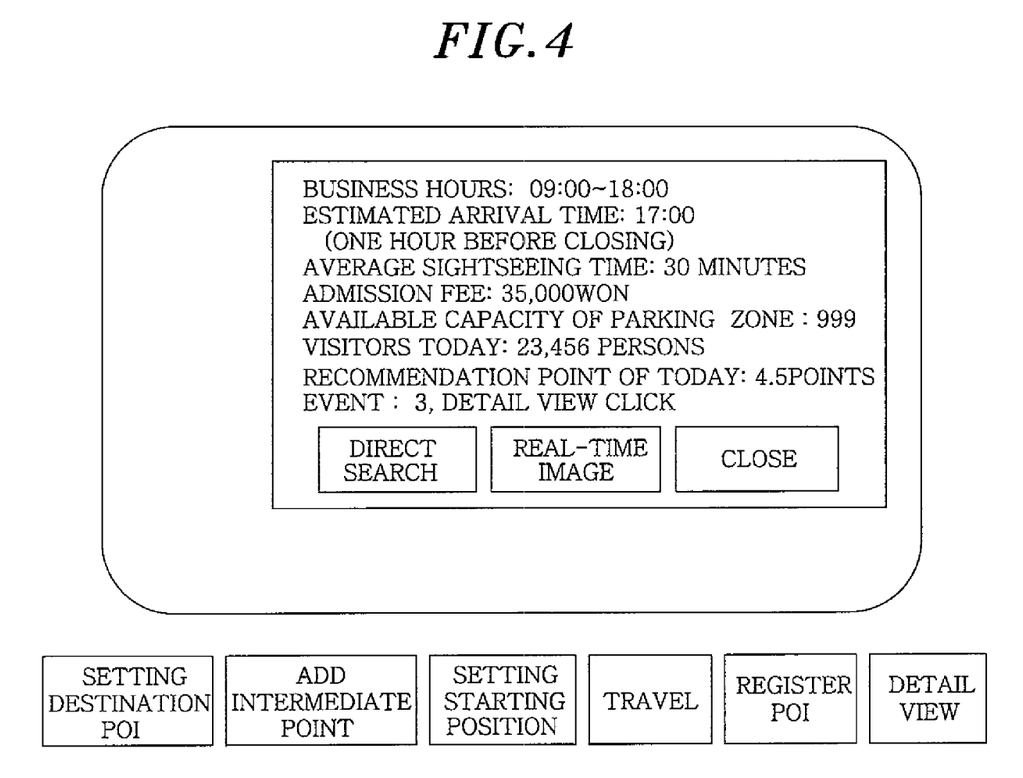
FIG. 4 is a view illustrating state information of POI in accordance with the embodiment of the present invention.

FIG. 4 shows state information of name-based POI displayed on the navigation device 30 as an enlarged view, e.g., by clicking a 'detail' button on the screen of the navigation device 30. In this view, an opening time, an estimated arrival time, an average sightseeing time, admission fee, an available capacity of a parking zone, the number of visitors on the current day, a ranking of recommendation on the current day, and event information are displayed. If a real-time image for representation is included in the state information on the screen or direct searching is available, the navigation device 30 may be configured such that buttons for 'viewing a real-time image' and 'direct search' are activated. However, when the estimated arrival time is over the closing time of POI, the button 'direct search' may be inactivated.

The acquisition of the state information of the name-based POIs may be utilized to check real-time information relating to a specific POI before a user selects the specific POI in the navigation device 30.

The user information DB 27 stores user identification information for identifying and authenticating a plurality of navigation devices or users thereof.

Figure 3:
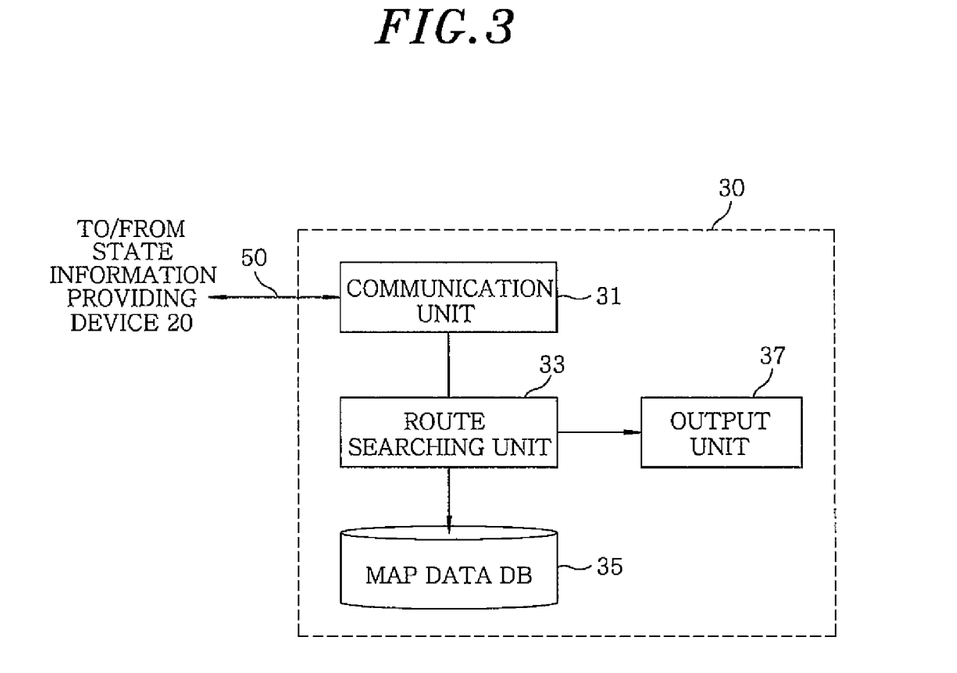
FIG. 3 is a detailed block diagram illustrating a navigation device shown in FIG. 1.

A map data DB 35 stores map data and is used to calculate state information such as the arrival time to the POI selected by a user.

The state estimator 28 corrects the omitted state information in response to the correction request signal from the state searching unit 26. For example, the state estimator 28 corrects a missing value of the omitted state information with reference to the history/analysis data DB 24 according to the correction request signal from the state searching unit 26.

FIG. 3 shows a detailed block diagram of the navigation device 30 shown in FIG. 1. The navigation device of FIG. 3 includes a communication unit 31, a route searching unit 33, the map data DB 35 and an output unit 37.

The communication unit 31 interfaces signals to be transmitted and received between the state information providing device 20 and the navigation device 30 through the communication network 50.

The route searching unit 33 applies the state information of name-based POIs, the state information of business type/theme-based POIs to the map data to guide to the POIs in the map data DB 35 to produce routes to the POIs. The output unit 37 visually outputs the routes to the POIs such that a user checks the routes having the state information of the POIs thereon while guiding along the routes.

The navigation devices may performs error correction of an error generated in the state information of POIs which is provided by the state information providing device 20. For example, the error correction may includes a procedure of calling the POI by a user on the telephone to find out the error, or performing an error verification by reading a related CCTV image, to correct the error utilizing the history/analysis data DB 24 and the reliability of the state information of POI when the omitted information is the error, and adjust reliability of a reporter down when the reporter's statement is false.

Figure 6A:
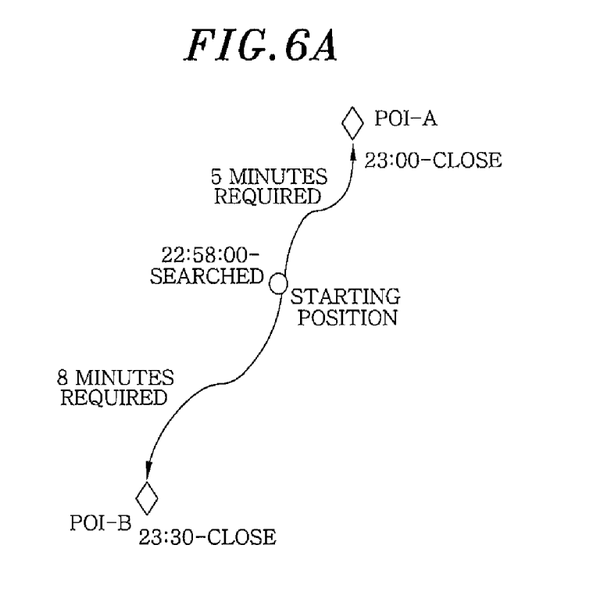
FIGS. 6A and 6B illustrate routes to a candidate POI to which the state information of the candidate POI is applied.
Figure 6B:
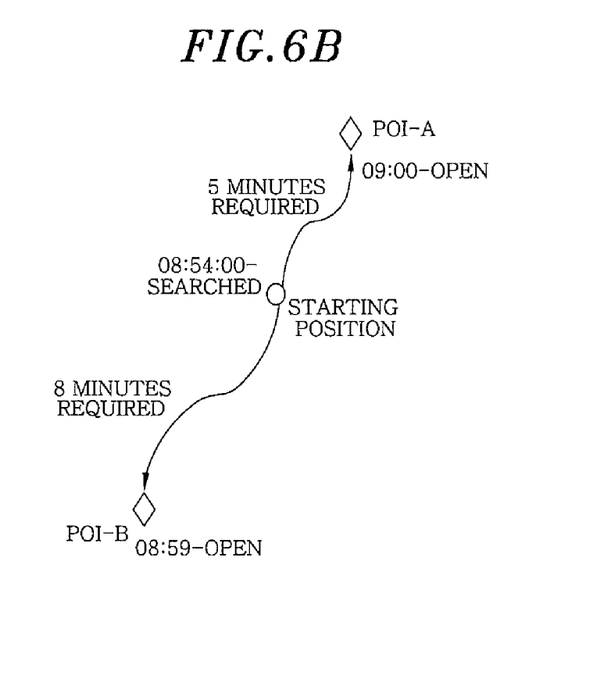

FIGS. 6A and 6B show routes to a candidate POI to which the state information of the POI is applied.

FIG. 6A shows that two candidate POIs, POI-A and POI-B near a current starting position are searched in a case where the reference time is set to the arrival time. As known from FIG. 6A, at present time 22:58:00, the candidate POI-A is closed at 23:00 and it takes 5 minutes from the starting position to the candidate POI-A; and the candidate POI-B is closed at 23:30 and it takes 8 minutes from the starting position to the candidate POI-B. However, since the candidate POI-A is open at a time point of the current time but it will close in 5 minutes, it is preferable rather to go to the candidate POI-B although it will take 8 minutes to the candidate POI-B. Thus, the candidate POI-B is recommended first and the candidate POI-A may be excluded.

On the contrary, there is a POI which is closed now but may be open on the way to or directly after the arrival at the POI as illustrated in FIG. 6B. In this case, it is more effective to arrive at the POI-A that is closed upon arrival but once there to wait for the POI-A to open. Therefore, the POI-B may be excluded from the candidate POIs and the POI-A is recommended first.

Therefore, according to the present invention, state information of POIs to be used in searching POIs is collected and analyzed and dynamic state information of the POIs is used to guide routes to the POIs so that the state information of the POIs may be inquired in real time and a route to the POI suitable for a visit purpose may be guided using the state information of the POI, thereby providing user convenience.

Figure 5A:
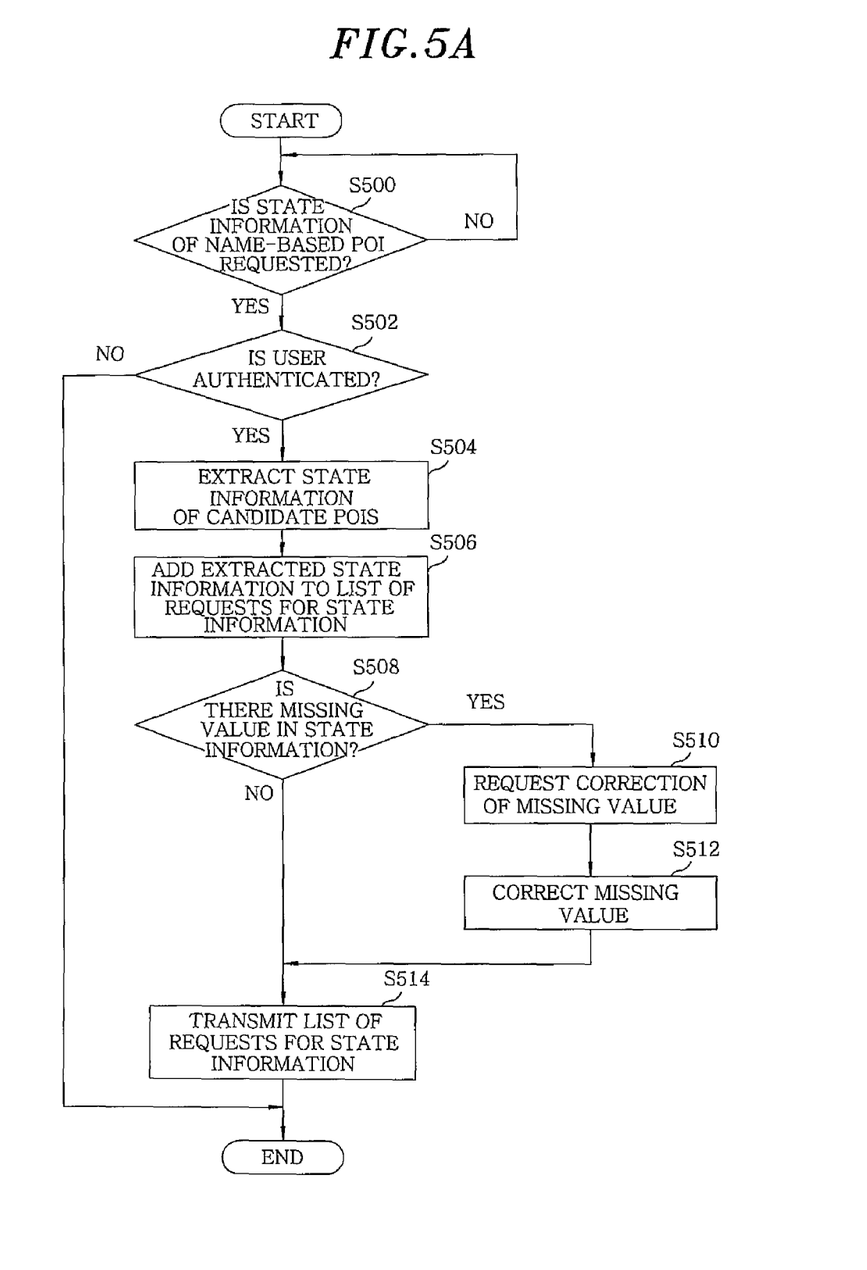
FIG. 5A is a flowchart illustrating a procedure of processing a request for state information of candidate POIs based on the name of POIs in accordance with the embodiment of the present invention.

FIG. 5A shows a flowchart sequentially illustrating a procedure of processing a request for state information of a POI based on names of the POIs according to an embodiment of the present invention.

First, when state information of name-based POI is requested by the navigation device 30 in step S500, the state searching unit 26 performs authentication for a user or the navigation device 30 by checking the identification of the user or the navigation device 30 from user information DB 27 in step S502. If the user is not authenticated, the procedure is ended.

When the user authentication is finished, the state searching unit 26 searches one or more candidate POIs matching the business type/theme for the state information DB 22 to classify the candidate POIs and extract state information of the candidate POIs in step S524. The extracted state information is inputted in the list of requested state information as in Table 2 in step S526.

Next, in step S508, the state searching unit 26 determines whether there is a missing value in the list of the requested state information. In step S508, if there is no missing value in the list of the requested state information, the procedure advances to step S514. If, however, there is a missing value in the list of requested state information, the procedure goes to step S510.

In step S510, the state searching unit 26 provides a correction request signal to correct the missing value to the state estimator 28. Then, in step S512, the state estimator 28 corrects the missing value using the history data and the analyzed results which are stored in the history/analysis data DB 24 in response to the correction request signal. In this step S512, the reliability of the state information having the corrected missing value is also contained.

Meanwhile, in step S514, the state information of the candidate POIs is provided to the navigation device 30 and the navigation device 30 applies the state information of the candidate POIs to map data in the map data DB 35 to create routes to the candidate POIs so that the user is guided along the routes, as illustrated in FIGS. 6A and 6B.

Figure 5B:
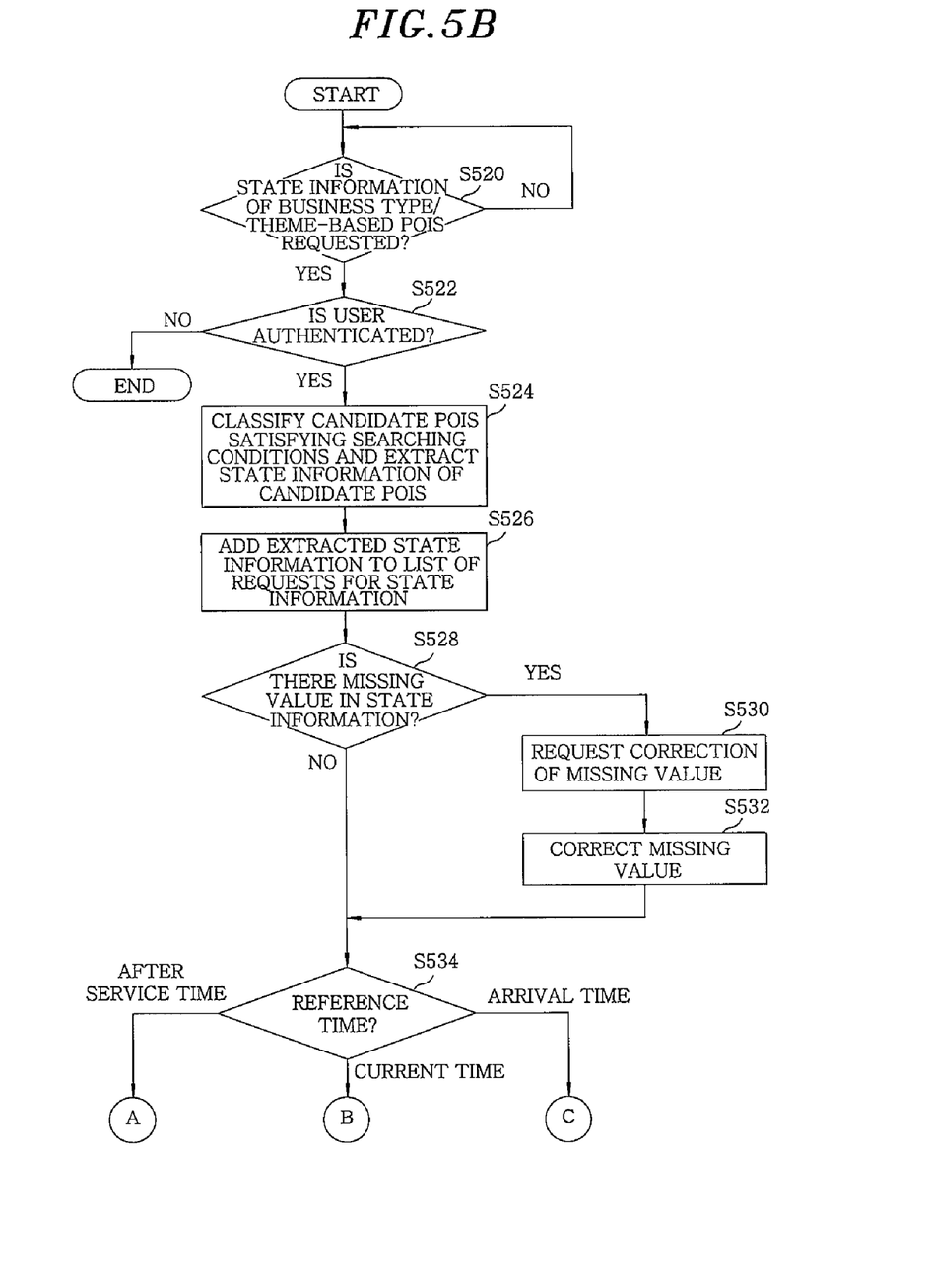
FIGS. 5B and 5C are flowcharts illustrating a procedure of processing a request for state information of candidate POIs based on business type/theme of the POIs and search conditions in accordance with the embodiment of the present invention.
Figure 5C:
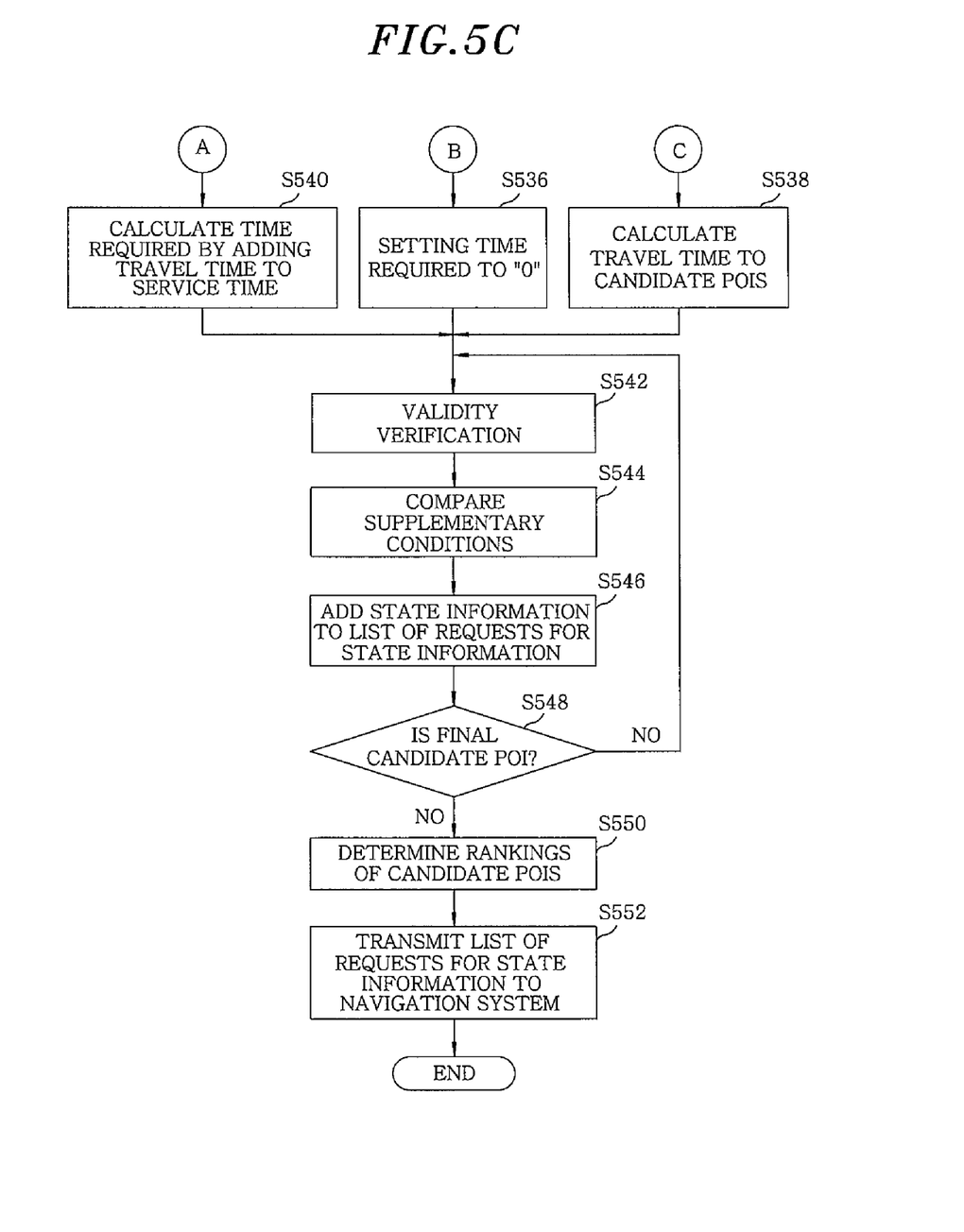

FIGS. 5B and 5C shows flowcharts sequentially illustrating a procedure of processing a request for state information of POI based on business types/themes.

First, in FIG. 5B, when the navigation device 30 requests state information of business type/theme-based POIs in step S520, the state searching unit 26 performs authentication for a user or the navigation device 30 by checking the identification of the user or the navigation device 30 from the user information DB 27 in step S522. When the user or the navigation device 30 is not authenticated, this procedure is ended.

When the user authentication is finished, the state searching unit 26 searches one or more candidate POIs matching the business type/theme for the state information DB 22 to classify the candidate POIs and extract state information of the candidate POIs in step S524. The extracted state information is putted in the list of requested state information as in Table 2 in step S526.

Next, in step S528, the state searching unit 26 determines whether there is a missing value in the list of requested state information.

If there is not a missing value in the list of requested state information, the procedure goes to step S534; however, if there is a missing value, the procedure moves to step S530.

In step S530, the state searching unit 26 provides a correction request signal to correct the missing value to the state estimator 28. Then, in step S532, the state estimator 28 corrects the missing value with reference to the history/analysis data DB 24 in response to the correction request signal. In this case, the reliability of the state information having the corrected missing value is also contained.

Thereafter, in step S534, it is checked that the reference time is the current time, the arrival time or after the service time.

If it is checked that the reference time is the current time, the procedure goes to step S536 through a tab 'B'. If it is checked that the reference time is the arrival time, the procedure advances to step S538 through a tab 'A'; and if it is checked that the reference time is after the service time (for example, after sightseeing), the procedure moves to step S540 through a tab 'C'.

In step S536, as shown in FIG. 5C, the time required for POI is set to '0' (zero).

In step S538, as shown in FIG. 5C, the travel time to the respective candidate POIs are calculated by searching for routes to the respective candidate POIs, which become the time required for POI.

And, in step S540, as shown in FIG. 5C, the service time (for example, a minimal sightseeing time) is added to the calculated respective travel times to calculate the time required for POI.

Subsequently, in step S542, the time required for POI, which has been calculated in the steps S536, S538 and S540, is reflected to the state of the respective candidate POIs, and a primary filtering of the candidate POIs is then performed through the validity verification, e.g., as illustrated in FIGS. 6A and 6B.

Next, in step S544, a supplementary condition (e.g., preference and reliability) comparison is performed upon the respective candidate POIs that have passed validity verification to perform the secondary filtering. Therefore, in step S546, state information of the candidate POIs to which the supplementary condition comparison has been performed is put in the list of request for state information.

The above-mentioned steps S542 to S546 are repeated until the above-mentioned steps are performed to a final candidate POI in step S548.

Next, in step S550, rankings of the candidate POIs in which the primary filtering and the secondary filtering are finished are generated according to general ranking reference such as time/distance order. In subsequence, in step S552, state information of the POIs with the generated rankings is provided to the navigation device 30. Therefore, the navigation device 30, as illustrated in FIGS. 6A and 6B, applies the state information of the respective POIs to routes to guide the user along the routes to the POIs.

As described above, according to the present invention, state information of POIs is gathered so that the user is guided along a route using dynamic state information of the POIs. Thus, since a user searches for the state information of the POI in real time and is guided along the route to the POI suitable to the visit purpose of the user, user convenience may be enhanced.

While the invention has been shown and described with respect to the preferred embodiments, it will be understood by those skilled in the art that various changes and modifications may be made without departing from the spirit and scope of the invention as defined in the following claims.

What is claimed is:

1. A route guide method comprising:
   collecting state information of respective points of interest (POIs) and storing the collected state information in a state information database;
   searching a plurality of candidate POIs stored in the state information database;
   extracting state information from each of the plurality of candidate POIs;
   analyzing the state information;
   determining whether each candidate POI is a valid POI based on the state information;
   sending information for each valid POI to a navigation device;
   providing an option to select a current time, an arrival time, or an after service time as a reference time;
   checking whether the reference time is the current time, the arrival time, or the service time; and
   calculating a time required value for each of the respective candidate POIs based on the reference time,
   wherein the after service time is based on a time for receiving services at an associated POI, and
   wherein the state information is information on a dynamic state of the POI.

2. The method of claim 1, wherein the plurality of candidate POIs are extracted from the state information database based on names of the plurality of candidate POIs.

3. The method of claim 1, wherein the plurality of candidate POIs is extracted from the state information database based on a business type or a theme of the plurality of candidate POIs.

4. The method of claim 1, wherein the plurality of candidate POIs is searched from the state information DB based on search conditions including travel times and distances to the plurality of candidate POIs.

5. The method of claim 1, wherein the state information includes at least one of operating hours from opening time to closing time, a number of service staffs, a service price, a ranking of recommendation, a coupon event, a real-time image, a waiting time for service, an available capacity of a parking zone, and a time required to be served at respective candidate POIs.

6. The method of claim 1, wherein the state information includes opening and closing times and service times for POIs.

7. The method of claim 1, wherein the time required value is set to zero if the reference time is the current time.

8. The method of claim 1, wherein the time required value is set to a travel time to the respective candidate POIs if the reference time is the arrival time.

9. The method of claim 6, wherein the time required value is calculated by adding a travel time to the respective candidate POIs and the service time for the respective candidate POIs if the reference time is the after service time.

10. The method of claim 1, further comprising:
    managing history data of the collected state information of the POIs and analysis results of the history data; and
    correcting a missing value with reference to the history data and the analyzed results when a missing value is present in the state information of the one or more candidate POIs.

11. The method of claim 10, wherein the state information having the corrected missing value contains reliability data of the state information.

12. A state information providing device of POIs (points of interest), the device comprising:
    a state information collector for collecting state information of the respective POIs;
    a state information database for storing the state information collected by the state information collector;
    a state information analyzer for managing history data of the state information collected by the state information collector and generating analysis results by performing statistical analysis upon the history data;
    a history/analysis database for storing the history data and the analysis results which are generated by the state information analyzer; and
    a state searching unit configured to search a plurality of candidate POIs, to extract state information from respective candidate POIs, and to analyze the extracted state information, to determine whether candidate POIs are valid based on the results of the analysis,
    wherein the state information includes service times for receiving services at respective POIs.

13. The state information providing device of claim 12, wherein the plurality of candidate POIs is selected by based on names of the plurality of candidate POIs.

14. The state information providing device of claim 12, wherein the plurality of candidate POIs is selected based on business type/theme of the plurality of candidate POIs.

15. The state information providing device of claim 12, wherein the plurality of candidate POIs is selected based on travel times and distances to plurality of candidate POIs.

16. The state information providing device of claim 12, wherein the state information further includes at least one of operating hours from opening time to closing time, a number of service staffs, a service price, a ranking of recommendation, a coupon event, a real-time image, and a waiting time for service, an available capacity of a parking zone.

17. The state information providing device of claim 12, further comprising a state estimator for correcting a missing value with reference to the history/analysis database when the missing value is present in the extracted state information of the candidate POIs.

18. The method of claim 1, wherein the state information includes at least one of a number of service staff, a service price, a ranking of recommendation, a coupon event, a real-time image, a waiting time for service, an available capacity of a parking zone, and a time required to be served at respective candidate POIs.

19. The method of claim 10, wherein the analysis results include results of statistical analysis of the history data, and
wherein the correcting the missing value is performed on a target state information which has the missing value and performed with reference to history data of the target state information and the results of the statistical analysis of the history data of the target state information.

20. The state information providing device of claim 17, wherein the analysis results include results of statistical analysis of the history data, and
wherein the state estimator revises a target state information which has the missing value with reference to history data of the target state information and the results of the statistical analysis upon the history data of the target state information.

* * * * *